(12) United States Patent
Sekiguchi

(10) Patent No.: US 6,834,254 B2
(45) Date of Patent: Dec. 21, 2004

(54) MONITOR SYSTEM OF VEHICLE OUTSIDE AND THE METHOD THEREOF

(75) Inventor: Hiroyuki Sekiguchi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 82 days.

(21) Appl. No.: 10/293,615

(22) Filed: Nov. 14, 2002

(65) Prior Publication Data

US 2003/0097237 A1 May 22, 2003

(30) Foreign Application Priority Data

Nov. 15, 2001 (JP) ........................................ 2001-350492

(51) Int. Cl.$^7$ ............................ G01B 5/02; G06F 15/00
(52) U.S. Cl. ...................... 702/158; 702/150; 702/152
(58) Field of Search ............................ 702/94, 95, 150, 702/152, 158, 159; 701/96, 301; 340/436, 903

(56) References Cited

U.S. PATENT DOCUMENTS 5,633,705 A 5/1997 Asayama
5,938,714 A * 8/1999 Satonaka ..................... 701/96
6,134,497 A * 10/2000 Hayashi et al. ............... 701/70

FOREIGN PATENT DOCUMENTS

DE 199 34 670 A1 12/2000
JP 06-230115 8/1994

* cited by examiner

Primary Examiner—Bryan Bui
(74) Attorney, Agent, or Firm—McGinn & Gibb, PLLC

(57) ABSTRACT

When a vehicle travels on an approximately straight lane, a distance data diagnosing section determines a distance measuring capability in a survey area in which the field of view of a laser radar overlaps that of an image as to a three-dimensional object. Then, the distance data diagnosing section determines whether or not the image-measured (laser-measured) distance data of the three-dimensional object exists, and when the image-measured (laser-measured) distance data thereof does not exist, the three-dimensional object is counted to the number of three-dimensional objects without image (without laser radar) and calculates three-dimensional object non-detecting ratios of image (laser radar) from the total number of three-dimensional objects to be determined and the number of three-dimensional objects without image (without laser radar).

20 Claims, 8 Drawing Sheets

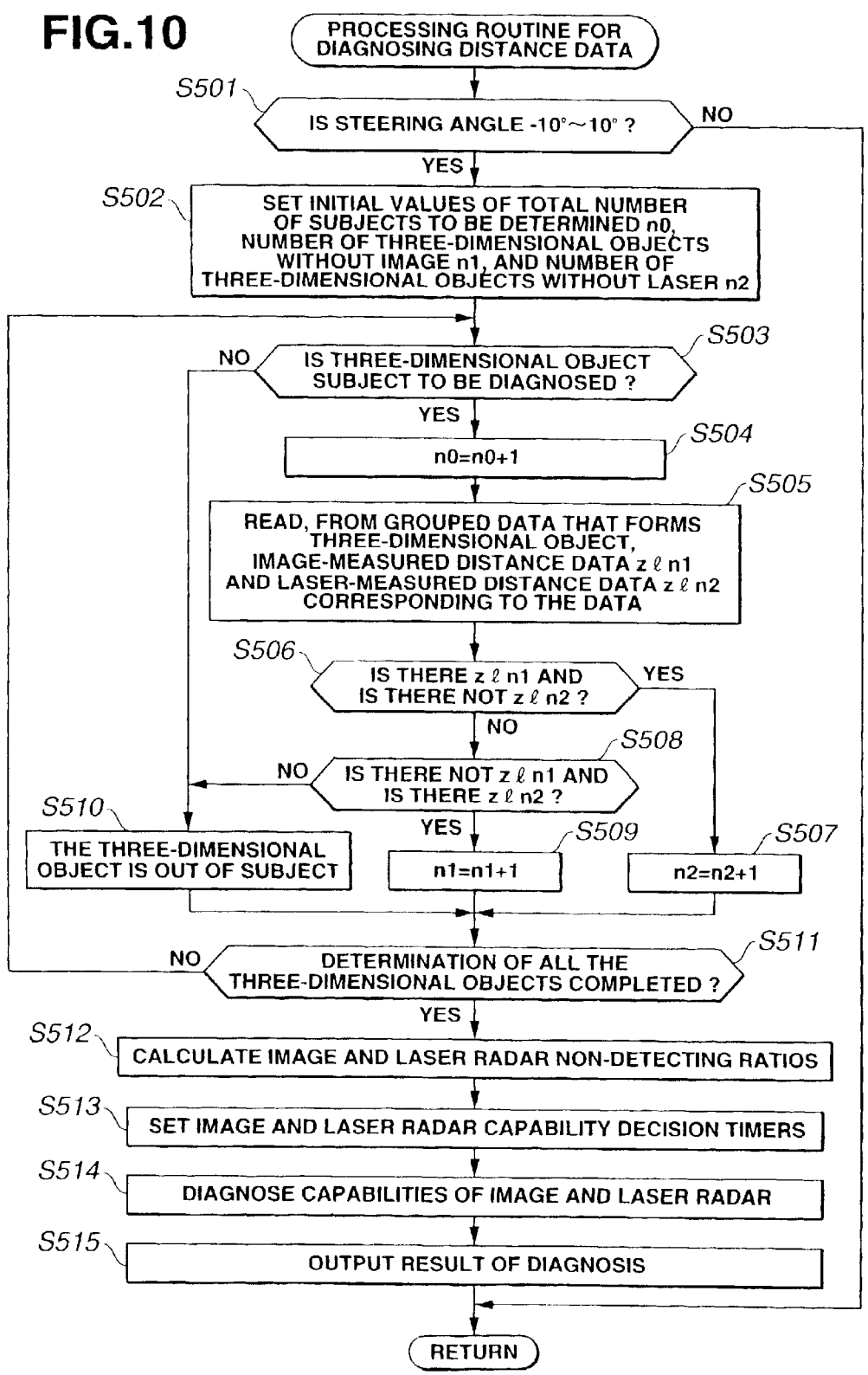

MONITOR SYSTEM OF VEHICLE OUTSIDE AND THE METHOD THEREOF

The disclosure of Japanese Patent Application No. 2001-350492 filed on Nov. 15, 2001 including the specification, drawings and abstract is incorporated herein by reference in its entirety.

BACKGROUND OF THE INVENTION

1. Field of the Invention

The present invention relates to a monitor system of a vehicle outside for detecting a distance between a vehicle and a three-dimensional object existing in front of the vehicle based on information from an image and an information derived from a laser radar, and to a method of monitoring of the vehicle outside.

2. Description of Related Art

Recently, technologies relating to an advanced safety vehicle (ASV) have been positively developed and some of the technologies have been in practical use. An advanced safety system which is composed of a TV camera, a laser radar, and the like mounted on a vehicle, detects preceding vehicles and obstructs, determines a degree of danger of collision thereagainst, and gives an alarm to a driver. And the vehicle is stopped by being automatically applied with a brake, or automatically increases or decreases its running speed so as to keep a safe distance between the vehicle and a precedingly running vehicle.

As one of these technologies, Japanese Unexamined Patent Application Publication No. 6-230115, for example, discloses a technology capable of detecting an accurate distance between the vehicles by being provided with two kinds of distance vehicle detecting devices, that is, cameras and a millimeter wave radar. This technology detects the accurate distance between the vehicles by selecting a more appropriate one of the devices, which has data with a higher degree of reliability, according to a running condition change of the vehicle.

However, the conventional technology described above has a problem that it is difficult to promptly process a lot of image data and to execute a precise control with an instant responsiveness. This is because a complicated calculation is required to determine the degree of reliability of the data obtained by the cameras and that of the data obtained by the millimeter wave radar, and thus an excessively long calculation time is necessary to select the data having a higher degree of reliability after the above degrees of reliability have been determined. Further, a problem is also arisen in that a delay is caused when the degrees of reliability are notified to a driver.

An object of the present invention, which was made in view of above circumstances, is to provide a monitor system of the vehicle outside capable of promptly determining a deterioration of the distance detecting capability of a laser radar and the deterioration of the distance detecting capability of an image without executing a calculation using many parameters, and the like. Another object of the present invention is to provide a monitor system of the vehicle outside capable of executing control such as the prompt notification of the diagnosed state of a system to the driver, and the like and to provide a method of monitoring the vehicle outside.

SUMMARY OF THE INVENTION

A monitor system includes image-measured distance detecting means for detecting a distance between a vehicle and a three-dimensional object existing in front of the vehicle based on informations of an image in front of the vehicle, laser-measured distance detecting means for detecting the distance between the vehicle and the three-dimensional object existing in front of the vehicle on the basis of the information of a laser radar by projecting a laser beam from the vehicle. The monitor system further includes three-dimensional object recognizing means for recognizing the three-dimensional object existing in front of the vehicle based on the distance detected by the image-measured distance detecting means and the distance detected by the laser-measured distance detecting means. The monitor system of the vehicle outside is characterized by being composed of distance detecting capability diagnosing means for determining a deterioration of the distance detecting capability of the image-measured distance detecting means as well as determining a deterioration of the distance detecting capability of the laser-measured distance detecting means. Hereupon, the image-measured distance detecting means detects the distance of the three-dimensional object recognized by the three-dimensional object recognizing means and the laser-measured distance detecting means detects the distance of the three-dimensional object recognized by the three-dimensional object recognizing means.

The above and other objects, features and advantages of the present invention will become more clearly understood from the following description by referring to the accompanying drawings.

BRIEF DESCRIPTION OF THE DRAWINGS

FIG. 10 is the flowchart of the processing routine for diagnosing the distance data.

DETAILED DESCRIPTION OF PREFERRED EMBODIMENTS

An embodiment of the present invention will be described below with reference to FIGS. 1 to 10.

Figure 1:
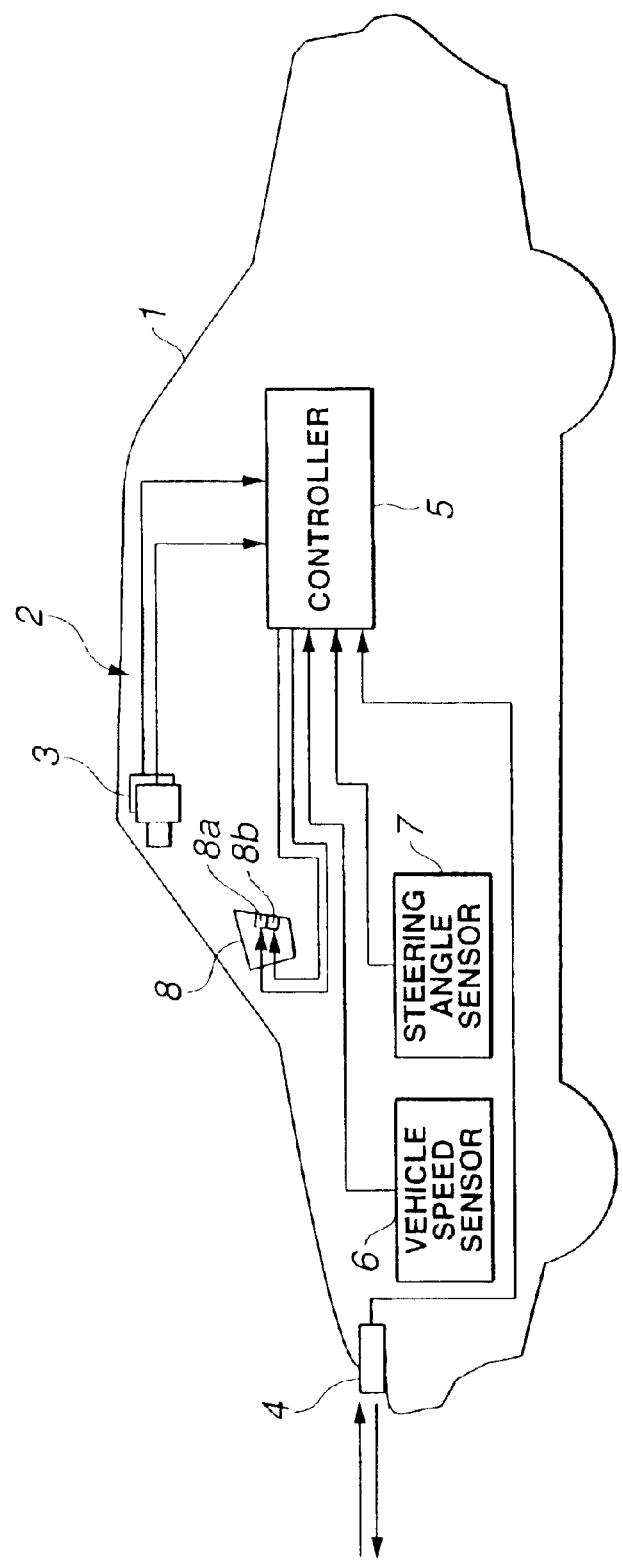
FIG. 1 is a view showing a schematic arrangement of a vehicle drive assist apparatus equipped with a monitor system of a vehicle outside.

In FIG. 1, reference numeral 1 denotes a vehicle (self-driven vehicle) 1 such as an automobile, and the like, and a vehicle drive assist apparatus (ADA apparatus) 2 is mounted on the vehicle 1 to decide a possibility of collisions and contacts of the vehicle 1 with a preceding three-dimensional object and to give an alarm when necessary. Note that the embodiment of the present invention will explain only the collision/contact preventing function and the explanation of the other functions will be omitted while the ADA apparatus 2 generally has a preventing function of lane deviation and the like, in addition to the collision/contact preventing function.

The ADA apparatus 2 includes a pair of (right and left) CCD cameras 3, 3, each of which uses a solid state image pickup device, for example, a charge coupled device (CCD) and the like as a three-dimensional optical system. The right and left CCD cameras 3, 3 are mounted on a roof of a passenger compartment on the front side thereof at a predetermined interval. The cameras 3, 3 record object data outside of the vehicle 1 by a three dimensional calculation from different fields of view, and input images of recorded objects to a controller 5.

Further, a laser projection unit 4 is mounted on the upper portion of a bumper (or other structural members) of the vehicle 1 and connected to the controller 5. The laser projection unit 4 includes a laser head having a function for projecting and receiving a laser beam and the function for scanning the laser beam in a right and left directions. The laser beam is horizontally projected from the laser projection unit 4, and detected are only the three-dimensional objects located at the positions higher than a road surface. The laser beam from the laser projection unit 4 repeats a distance detecting motion for detecting the distance to each object in such a manner that it is projected and received within a predetermined scanning range at predetermined intervals by being scanned in the right and left direction. And then, the laser beam measures the two-dimensional distribution of the three-dimensional object.

Figure 3:
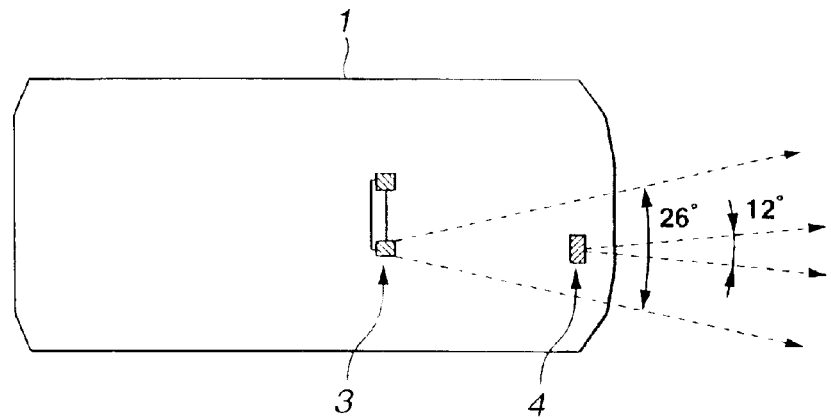
FIG. 3 is the view explaining a detection of distance data executed by CCD cameras and the detection of the distance data executed by a laser radar.

In this embodiment, the images forward of the vehicle 1 within a horizontal range of 26° in the right and left direction are inputted from the CCD cameras 3 to the controller 5, whereas the laser projection unit 4 executes a scan in 80 directions at intervals of 0.15° to thereby supply data forward of the vehicle 1 within a horizontal range of 12° in the right and left direction to the controller 5 at intervals of 0.1 second, as shown in, for example, FIG. 3.

Further, the vehicle 1 includes a vehicle speed sensor 6 for detecting a vehicle speed V and a steering angle sensor 7 for detecting a steering angle δ. The vehicle speed V and the steering angle δ are supplied to the controller 5.

The controller 5 is supplied with the images from the CCD cameras 3, the result of the scan executed by the laser projection unit 4, the vehicle speed V, and the steering angle δ. And the controller 5 independently determines the distance to a preceding three-dimensional object based on the images from the CCD cameras 3 and the distance to the preceding object based on the result of the scan executed by the laser projection unit 4, respectively. Then, the controller 5 coordinates the data of these distances and finally determines the distance to the preceding three-dimensional object based on the coordinated data, decides a risk of the collision and a possibility of the contact of the vehicle 1 with the preceding three-dimensional object, and gives an alarm, when necessary, by lighting a collision alarm lamp 8a of a combination meter 8. Further, the controller 5 determines the state in which the distance to the preceding three-dimensional object is detected on the basis of the images from the CCD cameras 3 and the state in which the distance to the preceding three-dimensional object is detected by the result of the scan executed by the laser projection unit 4, that is, the controller 5 determines the deterioration of the detecting capabilities of the CCD cameras 3 and the laser projection unit 4. After that, when the detecting capabilities of the camera 3 and the unit 4 are deteriorated, the controller 5 notifies a driver thereof by lighting a detected state display lamp 8b of the combination meter 8.

Figure 2:
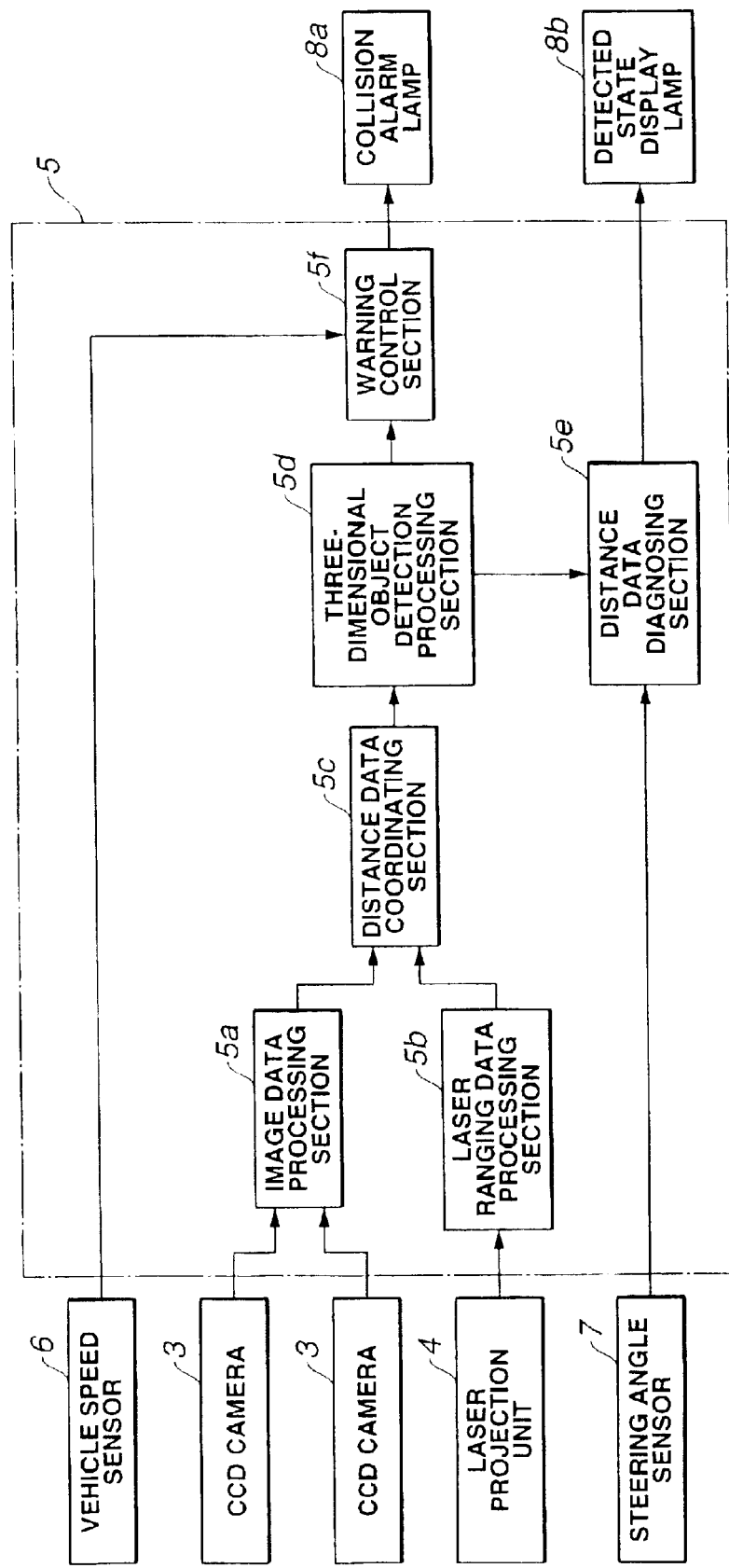
FIG. 2 is a block diagram showing a function of the vehicle drive assist apparatus.

That is, the controller 5 is arranged to have a function as a monitor system of a vehicle outside and composed of an image data processing section 5a, a laser ranging data processing section 5b, a distance data coordinating section 5c, a three-dimensional object detection processing section 5d, a distance data diagnosing section 5e, and a warning control section 5f, as shown in FIG. 2.

Figure 4:
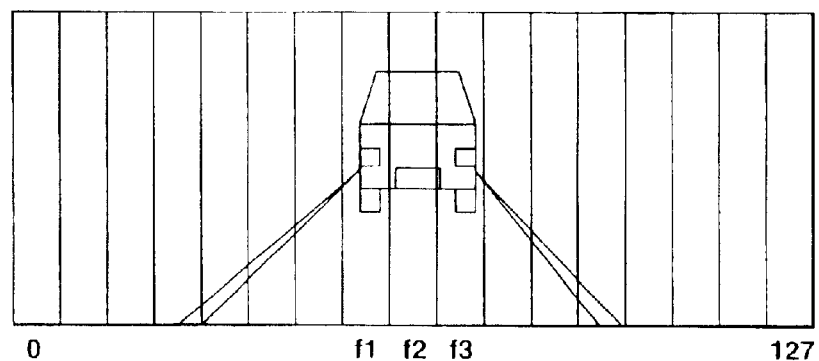
FIG. 4 is the view explaining a division of image-measured distance data.

The image data processing section 5a, which is provided as image-measured distance detecting means, equally divides the image from each CCD camera 3 into 128 segments in a right and left direction as shown in FIG. 4, and sets an array C zln corresponding to the divided image. Then, the image data processing section 5a determines a typical number of dislocated pixels for each segment, calculates the distances from the vehicle 1 to the three-dimensional object by the number of dislocated pixels and stores the distances as image-measured distance data C zln [0–127]. For example, C zln[3] shows the distance data of a segment No. 3, and when the distance data are ineffective, it is set to 999000.

The laser ranging data processing section 5b, which is provided as laser-measured distance detecting means, calculates the distance to an object by a period of time necessary from a time a laser beam is projected to a time the laser beam is received. Further, the laser ranging data processing section 5b calculates the two-dimensional position of the object (80 segments in total) from the direction in which the laser beam is scanned and stores thereof as laser-measured distance data L zln[0–79]. For example, L zln[3] shows the distance data of a segment No. 3, and when the distance data is ineffective, it is set to 999000.

The distance data coordinating section 5c transforms the 80 segments of the laser-measured distance data L zln [0–79] to the coordinate of the 128 segments of the image-measured distance data (laser-measured distance data lzrzln [0–127]) and coordinates the transformed laser-measured distance data lzrzln [0–127] with the image-measured distance data C zln[0–127].

A transformation of the laser-measured distance data L zln [0–79] to the laser-measured distance data lzrzln[0–127] is executed by, for example, the operation of an x-coordinate and a z-coordinate as shown below.

x-coordinate=laser-measured distance data $$\sin k[k-kv+50]+\text{x-coordinate of laser head} \quad (1)$$

$$\text{z-coordinate=laser-measured distance data+z-coordinate of laser head} \quad (2)$$

where, sink[k] shows a data table of $\sin((k-50)\cdot 0.155°)$, k=(laser segment number where center axis of laser head exits)−(image segment number where the center axis of the laser beam exists), "50" shows a segment number of center of data table, and 0.155 shows one step of 80 segments of the laser beam.

Further, the transformed laser-measured distance data lzrzln [0–127] is coordinated with the image-measured distance data C zln[0–127] as described below. Note that fln in [fln] shows each of 0–127 segments.

1. When the laser-measured distance data lzrzln[fln] is effective and a long distance data (20 m or more), a final distance data zln[fln] is set to the laser-measured distance data lzrzln[fln]. That is, zln[fln]=lzrzln[fln].

2. When the laser-measured distance data lzrzln[fln] is effective and intermediate distance data (10 m or more to less than 20 m) and the image-measured distance data C zln[fln] is effective as well as the difference between the image-measured distance data C zln[fln] and the laser-measured distance data lzrzln[fln] is within a predetermined value (for example, 2.5 m), the final distance data zln[fln] is set to the average value of the laser-measured distance data lzrzln[fln] and the image-measured distance data C zln[fln]. That is, zln[fln]=(lzrzln[fln]+C zln[fln])/2.

3. When the laser-measured distance data lzrzln[fln] is effective and the intermediate distance data (10 m or more to less than 20 m), the final distance data zln[fln] is setted to the laser-measured distance data lzrzln[fln] except the above item 2 case. That is, zln[fln]=lzrzln[fln].

4. When the laser-measured distance data lzrzln[fln] is effective and short distance data (3 m or more to less than 10 m), the final distance data zln[fln] is set to the image-measured distance data C zln[fln]. That is, zln[fln]=C zln[fln].

5. When the laser-measured distance data lzrzln[fln] is effective and very short distance data (less than 3 m), the final distance data zln[fln] is setted to the laser-measured distance data lzrzln[fln]. That is, zln[fln]=lzrzln[fln].

6. When the laser-measured distance data lzrzln[fln] is ineffective, the final distance data zln[fln] is setted to the image-measured distance data C zln[fln]. That is, zln[fln]=C zln[fln].

That is, in general, the distance data based on an image has a large error when an object is located at a far distant position, whereas it has a small error when the object is located at a near position. Further, when the object is located at a very near position, the preceding object is liable to be captured beyond a rear gate. Further, the distance data based on the laser radar have a relatively small error when the object is located at the far distant position, whereas it has a large error when the object is located at the near position. Accordingly, the data to be finally employed is previously selected as described in the above items 1 to 6 so that accurate distance data is finally obtained.

Then, the image-measured distance data C zln[0–127] are stored and output as zln1[0–127], and the transformed laser-measured distance data lzrzln[0–127] are stored and output as zln2[0–127]. Further, coordinated final distance data zln[0–127] are output to the detected three-dimensional object processing section 5d.

The three-dimensional object detection processing section 5d eliminates the singular points at the positions less than 40 m and the singular points at the positions equal to or more than 40 m, further detects the corner points of the three-dimensional object and a corner-shaped three-dimensional object based on the result of previous detection of the three-dimensional object, and recognizes the three-dimensional object by subjecting the final distance data zln[0–127] to a grouping processing. Accordingly, three-dimensional object recognizing means is composed of the distance data coordinating section 5c and the three-dimensional object detection processing section 5d.

Specifically, in the elimination of the singular points at the points less than 40 m, the three-dimensional object detection processing section 5d eliminates the distant three-dimensional objects, which are located between the three-dimensional objects having approximately the same distance from the vehicle 1, as the singular points in such a situation that the three-dimensional objects are complicatedly mixed and the distant three-dimensional-objects are observed from between near three-dimensional objects.

Figure 5:
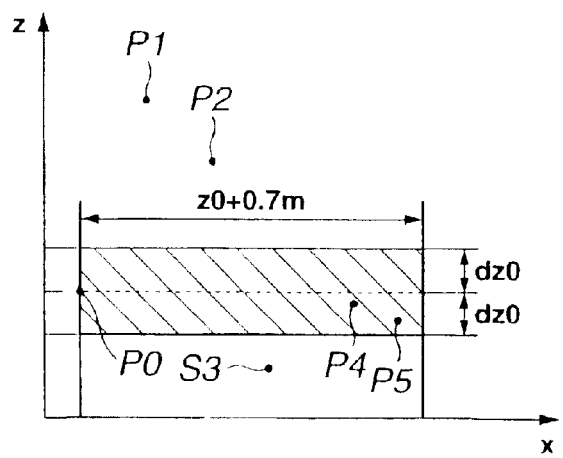
FIG. 5 is the view explaining singular points to be eliminated.

That is, as shown in FIG. 5, the three-dimensional object detection processing section 5d sets the points, which satisfy all of the following conditions, as the points having the same distance using the final distance data zln[fln], which are located at a position less than 40 m, as a reference point P0 (z0, x0) and eliminates the distant points located between these two points as the singular points. Note that the distance data of the points to be eliminated are substituted by 999000 similarly to the ineffective data.

In the example of FIG. 5, points P4 and P5, which exist in a hatched region, are recognized as the points having the same distance as the reference point P0. The hatched region is setted, for example, as shown below in a z-direction and an x-direction.

z-direction: reference point±dz0 (=z0·(164/4096)+200) mm x-direction: reference point+0.7 m Accordingly, in the example of FIG. 5, the points P1 and P2, which are located at the positions farther than the hatched region, are eliminated as the singular points, whereas the point P3, which is located at the position nearer than the hatched region, is not eliminated. As described above, the singular points of the final distance data zln[fln] located at a position less than 40 m are eliminated regardless of whether the distance data is based on an image or based on a laser radar, thereby the data processing is simplified.

Further, in the elimination of the singular points at the positions farther than 40 m, when the distant three-dimensional object is detected, the distance data obtained by the laser radar shows the right and left reflectors of the preceding vehicle. Accordingly, the distance data of an image located between the right and left reflectors are eliminated as the singular point.

For example, when the final distance data zln[0–127] are obtained as shown in FIG. 4 and the segments f1 and f3 satisfy all the conditions described below, it is determined that f1 and f3 show the reflectors of the preceding vehicle.

1. The f1 and f3 are the distance data obtained by the laser radar.

2. The value of the f1 is 40 m or more.

3. The difference between the f1 and f3 is ±0.5 m or less in a longitudinal direction.

4. The interval between the f1 and f3 is 2 m or less in a lateral direction.

Then, when f2 satisfies the following two conditions, the distance data of the f2 are eliminated as the singular point and substituted with 999000.

1. The f2 is distance data obtained by the image.

2. The f2 is located at a position farther than the f1.

As described above, when the distance of the preceding vehicle is detected by the laser radar in the distance data of 40 m or more, the laser radar detects the distance mainly by the reflectors of the preceding vehicle. Focusing attention on this point, a three-dimensional object is recognized accurately and promptly by eliminating the distance data, which is obtained based on an image located at a more distant position and exists between the distance data obtained by the laser radar, as the singular point when it is determined that the distance data is not necessary or that it has a large error.

Then, the three-dimensional object detection processing section 5d provides a survey area using the corner point of a corner-shaped three-dimensional object detected last time as the center of the survey area and examines the final distance data zln[0–127] which is detected this time and from which the singular points are eliminated as described above to thereby detect whether or not a new corner point exists.

Thereafter, the three-dimensional object detection processing section 5d groups the data, that is, sets a threshold value, groups the zln[fln] within the threshold value, extracts side wall data from the inclination, and the like of the grouped data, and detect the three-dimensional object and a side wall by dividing and coordinating the grouped data. Thus, the information of the detected three-dimensional object is supplied to the distance data diagnosing section 5e and to the warning control section 5f.

The distance data diagnosing section 5e, which is provided as distance detecting capability diagnosing means, determines whether or not the finally detected three-dimensional object is detected in both the image-measured distance data C zln[0–127] (zln1[0–127]) and the transformed laser-measured distance data lzrzln[0–127] (zln2[0–127]). When the finally detected three-dimensional object is not detected by the image-measured distance data zln1[0–127], the distance data diagnosing section 5e determines that a capability for measuring a distance by the image is deteriorated and notifies the driver thereof by lighting the detected state display lamp 8b of the combination meter 8 as prescribed. Further, when the finally detected three-dimensional object is not detected by the laser-measured distance data zln2[0–127], the distance data diagnosing section 5e determines that the capability for measuring the distance by the laser is deteriorated and notifies the driver thereof by lighting the detected state display lamp 8b of the combination meter 8 as prescribed.

The distance measuring capability is determined when the vehicle 1 travels on an approximately straight road at a steering angle of −10° to +10°. This is because when the distance is detected by the laser radar, it is difficult to recognize the three-dimensional object because a laser beam is projected at an inclined angle and is not reflected by the object, while the guard rail and the side wall are recognized when the distance is detected by the image.

Further, the survey area of the three-dimensional object in which the distance measuring capability is determined is setted in an area where the field of view of the laser radar overlaps that of the image, and the three-dimensional object, which exists 40 to 70 m ahead of the vehicle 1 and has a width of 50 cm or more, is used as the three-dimensional object for determining the distance measuring capability. The reason why the three-dimensional object existing 40 to 70 m ahead of the vehicle 1 is used resides in that the error between the distance data obtained by the image and the distance data obtained by the laser radar is increased when the three-dimensional object existing farther than the above distances is also used for the determination. Further, this is because that the distance measuring capability cannot be determined by the distance data of a forward three-dimensional object locating at a position less than 40 m ahead of the vehicle 1 because the deterioration of the distance measuring capability is very small in the three-dimensional object. Furthermore, the reason why the three-dimensional object having the width of 50 cm or more is used resides in that the three-dimensional object may be erroneously recognized in a vacant space between the three-dimensional objects in the image when there are a plurality of the preceding vehicles.

Then, the distance data diagnosing section 5e determines whether or not the image-measured distance data zln1[0–127] exist with respect to the three-dimensional object, and when the image-measured distance data do not exist therein, the three-dimensional object is counted to the number of the three-dimensional objects without image n1. Likewise, the distance data diagnosing section 5e determines whether or not the laser-measured distance data zln2[0–127] exist in the three-dimensional object, and when the laser-measured distance data do not exist therein, the three-dimensional object is counted to the number of the three-dimensional objects without a laser n2. With this manner, an undetecting ratio of the three-dimensional object of the image is calculated from the total number of the three-dimensional objects to be processed n0 and the number of the three-dimensional objects without image n1 (=(n1/n0)·100%), thereby the undetecting ratio of the laser radar is calculated (=(n2/n0)·100%).

Then when the undetecting ratio of the image is equal to or more than a preset detection ratio threshold value k6, the distance data diagnosing section 5e increments an image capability determination timer, whereas the distance data diagnosing section 5e decrements the image capability determination timer when it is less than the detection ratio threshold value k6. Thus, when the value of the capability determination timer exceeds a preset output threshold value k1, the distance data diagnosing section 5e determines that the distance measuring capability of the image is deteriorated and lights the detected state display lamp 8b as prescribed. Further, when the value of the capability determination timer is equal to or less than a preset cancel threshold value k2 (<k1 and, for example, 0), the distance data diagnosing section 5e extinguishes the detected state display lamp 8b being lit.

Likewise, when the undetecting ratio of the laser radar is equal to or more than a preset detection ratio threshold value k5, the distance data diagnosing section 5e increments a laser radar capability determination timer, whereas the distance data diagnosing section 5e decrements the laser radar capability determination timer when it is less than the detection ratio threshold value k5. Thus, when the value of the capability determination timer exceeds a preset output threshold value k3, the distance data diagnosing section 5e determines that the distance measuring capability of the laser radar is deteriorated and lights the detected state display lamp 8b as prescribed. Further, when the value of the capability determination timer is equal to or less than a preset cancel threshold value k4 (<k3, and for example, 0), the distance data diagnosing section 5e extinguishes the detected state display lamp 8b being lit.

As described above, the deterioration of the distance measuring capabilities of the image and the laser radar is determined depending on whether or not there are the distance data of the image and the laser radar that have detected the finally detected three-dimensional object in this embodiment. Accordingly, the deterioration of the distance measuring capabilities of the image and the laser radar is promptly and accurately determined.

The warning control section 5f extracts other vehicles, obstructs, and the like existing on the right and left lanes adjacent to the lane of the vehicle 1 based on the three-dimensional object information from the three-dimensional object detection processing section 5d, the vehicle speed V from the vehicle speed sensor 6, and the like. Then, the warning control section 5f decides the possibility of the collision and contact of the other vehicles, the obstacles, and the like with the vehicle 1 from the positions and sizes of the thus extracted objects, the relative speeds of them to the vehicle 1 determined from the positional changes with time, and the like. As a result, the warning control section 5f gives the alarm when necessary by lighting the collision alarm lamp 8a of the combination meter 8.

Figure 6:
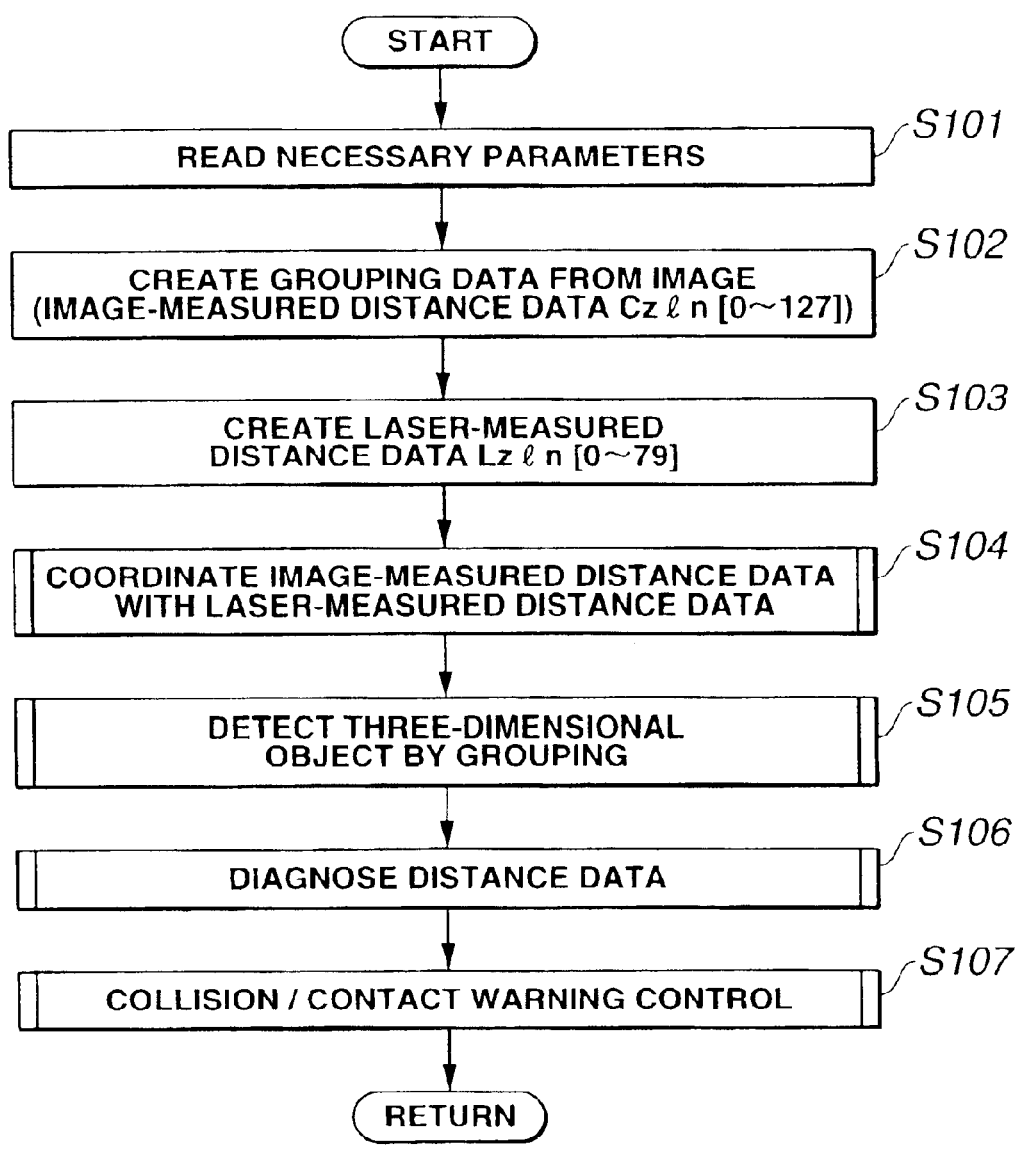
FIG. 6 is a flowchart of a forward monitor program.

Next, a forward monitor program executed by the controller 5 described above will be described below using the flowcharts of FIGS. 6 to 10. FIG. 6 is a flowchart showing the overall flow of the forward monitor program. First, necessary parameters are read at step (hereinafter, abbreviated as "S") 101.

Then, a process goes to S102 and creates the grouping data (image-measured distance data C zln[0–127]) from the image. That is, the image data processing section 5a equally divides the image from each CCD camera 3 into 128 segments in a right and left direction as shown in FIG. 4, and sets an array C zln corresponding to the segments. Then, the image data processing section 5a determines a typical number of dislocated pixels for each segment, calculates the distance to the three-dimensional object from the number of dislocated pixels and stores the distance as the image-measured distance data C zln[0–127]. For example, C zln[3] shows the distance data of a segment No. 3, and when the distance data are ineffective, it is set to 999000.

Next, the process goes to S103 at which the laser ranging data processing section 5b creates laser-measured distance data L zln[0–79]. That is, the laser ranging data processing section 5b calculates the distance to the object by a period of time necessary from a time the laser beam is projected to a time the laser beam is received. Further, the laser ranging data processing section 5b calculates the two-dimensional position (80 segments in total) of the object from a direction in which the laser beam is scanned and stores thereof as laser-measured distance data L zln[0–79]. For example, L zln[3] shows the distance data of the segment No. 3, and when the distance data is ineffective, it is setted to 999000.

Figure 7:
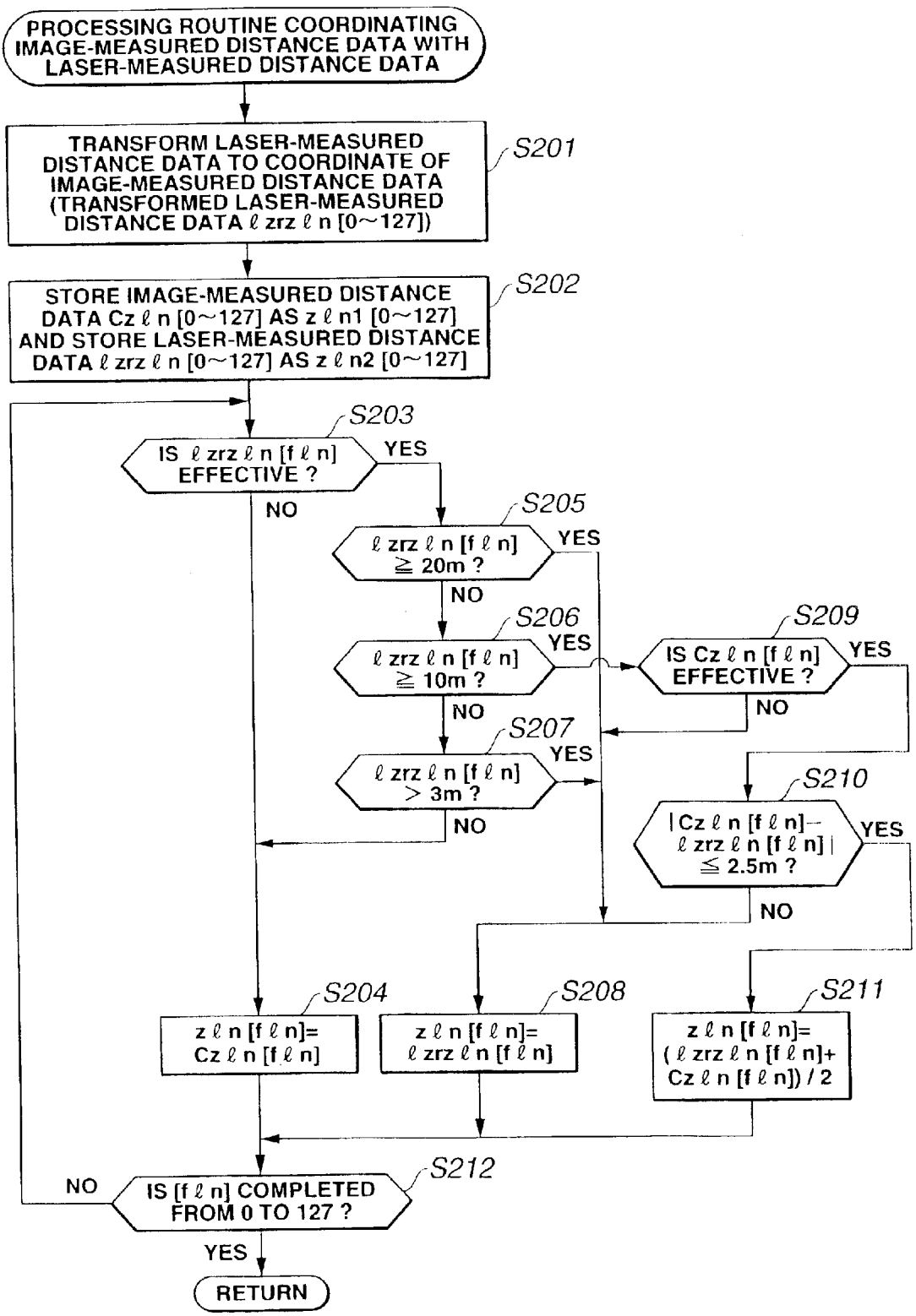
FIG. 7 is the flowchart of a processing routine for coordinating the image-measured distance data with radar-measured distance data.

Thereafter, when the process goes to S104, the image-measured distance data is coordinated with the laser-measured distance data as shown in the flowchart of FIG. 7.

In the flowchart of FIG. 7, first at S210, the distance data coordinating section 5c transforms the 80 segments of the laser-measured distance data L zln[0–79] to the coordinate of the 128 segments of the image-measured distance data (laser-measured distance data lzrzln[0–127]). The laser-measured distance data L zln[0–79] are transformed to the laser-measured distance data lzrzln[0–127] by, for example, Equations (1) and (2) described above.

Subsequently, the process goes to S202 at which the image-measured distance data C zln[0–127] is stored as zln1[0–127] and the transformed laser-measured distance data lzrzln[0–127] are stored as zln2[0–127], and then the process goes to S203.

At S203, it is determined whether or not the laser-measured distance data lzrzln[fln] of a segment to be handled is effective. Note that, hereinafter, [fln] shows the segment of the data to be handled and covers all the 128 segments from 0 to 127 in correspondence to S212 that will be described later.

When the laser-measured distance data lzrzln[fln] are ineffective as the result of the determination at S203, the process goes to S204 and sets the final distance data zln[fln] to the image-measured distance data C zln[fln]. That is, zln[fln]=C zln[fln].

Further, when the laser-measured distance data lzrzln[fln] are effective as the result of the determination at S203, the process goes to S205 and determines whether or not the laser-measured distance data lzrzln[fln] are located at a long distance position (20 m or more).

When the laser-measured distance data lzrzln[fln] are not located at the long distance position (20 m or more) as the result of the determination at S205, the process goes to S206 and determines whether or not the laser-measured distance data lzrzln[fln] are located at the intermediate distance position (10 m or mote to less than 20 m).

When the laser-measured distance data lzrzln[fln] are not located at the intermediate distance position (10 m or more to less than 20 m) as the result of the determination at S206, the process goes to S207 and determines whether or not the laser-measured distance data lzrzln[fln] are located at the short distant position (3 m or more to less than 10 m) or at the very short distant position (less than 3 m).

In the determinations from S205 to S207 described above, first, when it is determined at S205 that the laser-measured distance data lzrzln[fln] are located at the long distance position (20 m or more), the process goes to S208 at which the final distance data zln[fln] are set to the laser-measured distance data lzrzln[fln] that have a relatively small error at the long distance position. That is, zln[fln]=lzrzln[fln].

Further, in the determinations from S205 to S207 described above, when it is determined at S206 that the laser-measured distance data lzrzln[fln] are located at the intermediately distant position (10 m or more to less than 20 m), the process goes to S209 and determines whether or not the image-measured distance data C zln[fln] are effective. When the image-measured distance data C zln[fln] are ineffective, the process goes to S208 at which the final distance data zln[fln] are set to the laser-measured distance data lzrzln[fln]. That is, zln[fln]=lzrzln[fln].

Further, when the-image-measured distance data C zln[fln] are determined effective at step S209, the process goes to S210 and determines whether or not the difference between the image-measured distance data C zln[fln] and the laser-measured distance data lzrzln[fln] is equal to or less than 2.5 m. When the difference is equal to or larger than 2.5 m, the process goes to S208 and sets the final distance data zln[fln] to the laser-measured distance data lzrzln[fln]. That is, zln[fln]=lzrzln[fln].

Further, when the difference between the image-measured distance data C zln[fln] and the laser-measured distance data lzrzln[fln] is less than 2.5 m at S210, the process goes to S211 at which the final distance data zln[fln] are setted to the average value of the laser-measured distance data lzrzln[fln] and the image-measured distance data C zln[fln]. That is, zln[fln]=(lzrzln[fln]+C zln[fln])/2.

In contrast, in the determinations from S205 to S207 described above, when it is determined at S207 that the laser-measured distance data lzrzln[fln] are located at the short distance position (3 m or more to less than 10 m), the process goes to step S204 and sets the final distance data zln[fln] to the image-measured distance data C zln[fln] that have a relatively small error at the short distance position. That is, zln[fln]=C zln[fln].

Further, when it is determined at S207 that the laser-measured distance data zln[fln] is located at the very short distance position (less than 3 m), the process goes to S208 and sets the final distance data zln[fln] to the laser-measured distance data lzrzln[fln]. That is, zln[fln]=lzrzln[fln].

After the final distance data zln[fln] are setted at S204, S208, or S211, the process goes to S212 and determines whether or not the coordinate processing is completed as to the laser-measured distance data lzrzln[fln] of all the 128 segments from 0 to 127 to be handled. When the coordinate processing is completed, the process escapes from the routine, whereas the processing steps from S203 to S211 described above are repeated to the subsequent segments when the coordinate processing is not completed.

As described above, according to the coordinate processing of the image-measured distance data with the laser-measured distance data of this embodiment, the data having the smaller error are preferentially used depending upon a previously detected distance. Accordingly, the distance measured by the laser radar is promptly coordinated with the distance measured by the image in an optimum manner without executing the complicated calculation, thereby the result of the coordination is promptly outputted as the data of a forward three-dimensional object.

Figure 8:
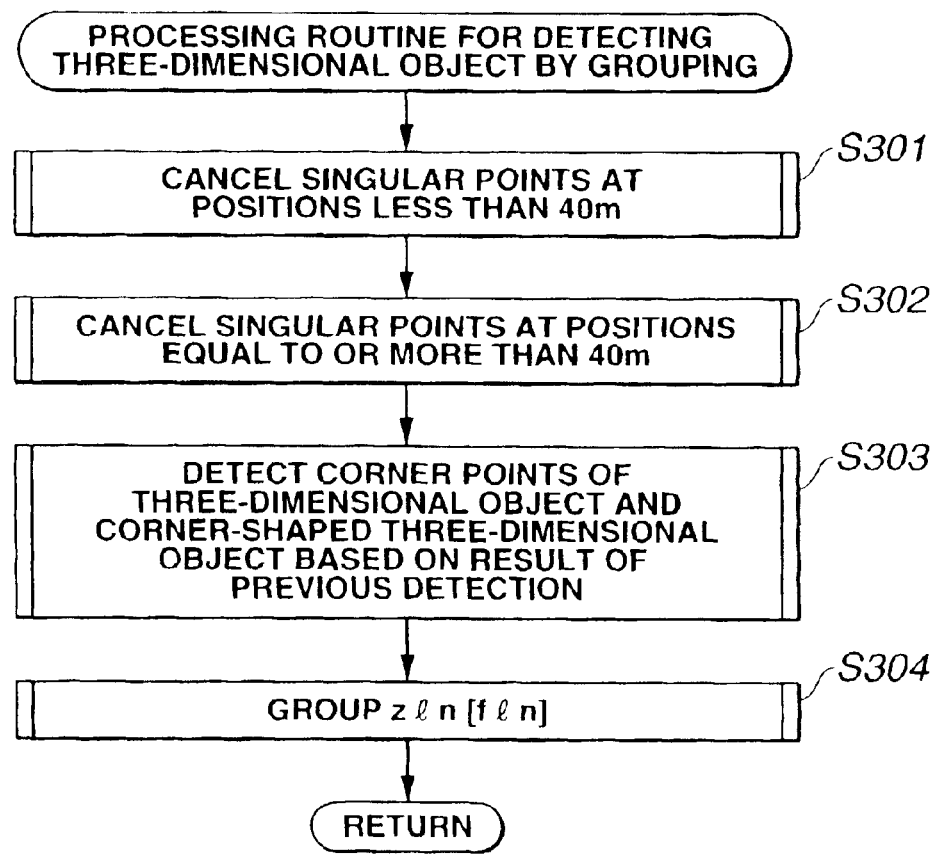
FIG. 8 is the flowchart of a processing routine for detecting a three-dimensional object by grouping.

After the image-measured distance data is coordinated with the laser-measured distance data at S104 described above, the process goes to step S105 and detects a three-dimensional object by the grouping shown in FIG. 8.

In the flowchart of FIG. 8, first, the three-dimensional object detection processing section 5d eliminates the singular points located at positions less than 40 m at step S301. That is, the distant three-dimensional objects located between the three-dimensional objects having approximately the same distance from the vehicle 1 are eliminated as the singular points in such a situation that the three-dimensional objects are complicatedly mixed and the distant three-dimensional objects are observed from between the near three-dimensional objects. As shown in FIG. 5, the points, which satisfy all of the following conditions, are setted as the points having the same distance using the final distance data zln[fln], which are located at the position less than 40 m, as a reference point P0 (z0, x0), the distant points located between these two points are eliminated as the singular points. Note that the distance data of the points to be eliminated is substituted by 999000 similarly to the ineffective data. As described above, the singular points of the final distance data zln[fln] located at the position less than 40 m are eliminated regardless of whether the distance data is based on the image or based on the laser radar, thereby the data processing is simplified.

Figure 9:
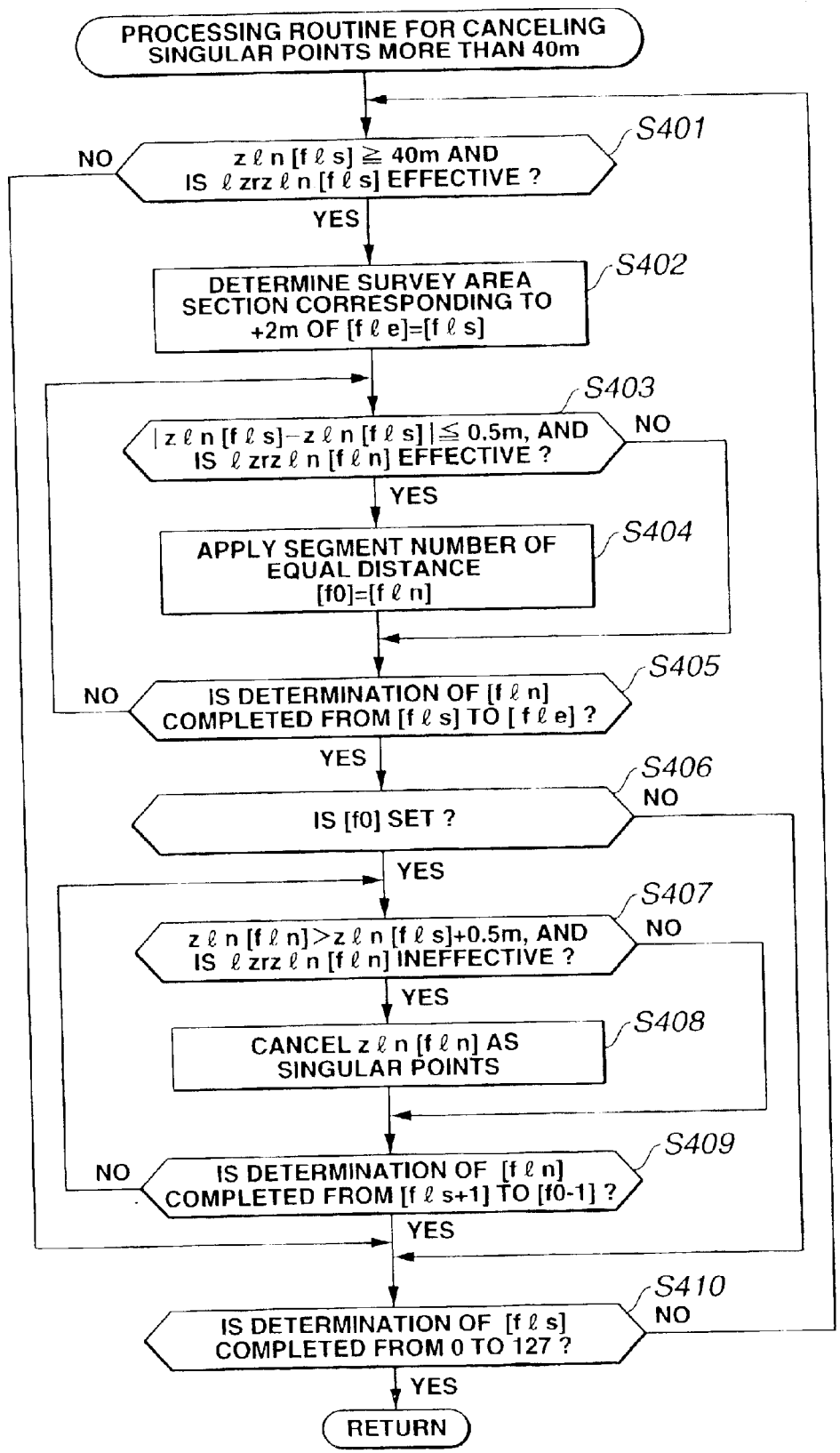
FIG. 9 is the flowchart of the processing routine for eliminating the singular points at positions of 40 m or more.

Next, as shown in FIG. 9, the process goes to step S302 at which the singular points located at the positions of 40 m or more are eliminated as described later.

Then, the process goes to S303, at which the three-dimensional object detection processing section 5d provides a survey area using the corner point of the corner-shaped three-dimensional object detected last time as the center of the survey area, and examines the final distance data zln [0–127], which are detected this time and from which the singular points are eliminated at S301 and S302, to thereby detect whether or not a new corner point exists.

Thereafter, the process goes to S304 at which the three-dimensional object detection processing section 5d groups the data, that is, sets a threshold value, groups the final distance data zln[fln] that exist within the threshold value, extract side wall data from the inclination, and the like of the grouped data, and divide and coordinate the grouped data to thereby detect the three-dimensional object and the side wall.

As shown in the flowchart of FIG. 9, in the processing step executed at S302 for eliminating the singular points located at the positions of 40 m or more, first, it is determined at S401 whether or not the distance data zln[fls] of the segments to be handled are the data of 40 m or more as well as whether or not the laser-measured distance data lzrzln[fls] of the segments are effective. Note that, hereinafter, [fls] shows the segments of the data to be handled, and the data are divided into 128 segments from 0 to 127 in correspondence to S410 that will be described later.

Then, the process jumps to S410 when the result of the determination at S401 shows at least any one of that the distance data zln[fls] is less than 40 m and that the laser-measured distance data lzrzln[fls] of the segments are ineffective. Then, it is determined at step 410 whether or not the processing of the distance data zln[fls] of all the 128 segments from 0 to 127 to be handled is completed. When the processing is completed, the process escapes from the routine, whereas the processing steps from S401 are executed again as to the subsequent segments when it is not completed.

When it is determined that the distance data zln[fls] are the data of 40 m or more as well as that the laser-measured distance data lzrzln[fls] of the segments are effective as the result of determination at S401, the process goes to S402 and sets a survey area using the laser-measured distance data lzrzln[fls] of the segments as a reference, and the segment is set to the segment zln[fle] of the survey area at the other end thereof in correspondence to the position spaced apart from the zln[fls] by 2 m in the right direction.

Then, the process goes to S403 and determines whether or not the difference of the distance between zln[fls] and zln[fle] is 0.5 m or less in the survey area of the segments from zln[fls] to zln[fle] (that is, |zln[fls]−zln[fln]|≦0.5 m, and "fln" shows the segment number from "fls" to "fle") as well as determines whether or not the laser-measured distance data lzrzln[fln] thereof are effective.

When the above conditions are satisfied as the result of the determination at S403, the process goes to step S404 and determines that the segment is the segment of the same three-dimensional object of which distance is equal to the distance of the zln[fls], and the segment is setted as right end segment data zln[f0] corresponding to the zln[fls]. That is, f0=fln.

When the right end segment data zln[f0] corresponding to the zln[fls] are setted at S404 or when it is determined at S403 that the above conditions are not satisfied, the process goes to S405 and determines whether or not the determination of all the segment numbers from [fls] to [fle] is completed. When the determination is not completed, the process returns to S403 again and executes the determination as to the subsequent segments from [fls] to [fle].

When the determination of all the segments from [fls] to [fle] is completed at S405, the process goes to S406 and determines whether or not the right end-segment data zln[f0] corresponding to the zln[fls] are setted. When the right end segment data zln[f0] are not setted as the result of the determination, the process jumps to S410 and determines the processing steps of the distance data zln[fls] of all the 128 segments from 0 to 127 to be handled are completed. When the processing steps are completed, the process escapes from the routine, whereas the processing steps from S401 are executed again as to the subsequent segments when they are not completed.

Further, when it is determined at S406 that the right end segment data zln[f0] corresponding to the zln[fls] are setted, the process go to S407. At step S407, it is determined whether or not the distance data zln[fln] are located at the position farther than the zln[fls]+0.5 m as well as whether or not the laser-measured distance data lzrzln[fln] thereof are ineffective in the data of the segments from "fls+1" to "f0−1" (segments from "fls" to "f0").

Then, when the above conditions are satisfied at S407, the process goes to S408 and eliminates the data zln[fln] as the singular points.

When the segments from "fls" to "f0" are eliminated as the singular points at S408 or when the above conditions are not satisfied at step S407, the process goes to S409 and determines whether or not the determination of all the segments from "fls" to "f0" is completed.

When the determination of all the segments from "fls" to "f0" is not yet completed at S409, the determination of the subsequent segments from "fls" to "f0" is executed from S407. In contrast, when the determination of all the segments from "fls" to "f0" is completed, the process goes to S410 and determines whether or not the processing of the distance data zln[fls] of all the 128 segments from 0 to 127 to be processed is completed. When the processing is completed, the process escapes from the routine, whereas the process executes the processing steps again from S401 as to the subsequent segments when it is not completed.

As described above, in the distance data of 40 m or more, when the distance of a preceding vehicle is detected by the laser radar, the laser radar detects the distance mainly by the reflectors of the preceding vehicle. Accordingly, the main important point in this embodiment, the three-dimensional object is recognized accurately and promptly by eliminating the distance data, which is obtained based on an image located at a more distant position and exists between the distance data obtained by the laser radar as the singular point when it is determined that the distance data are not necessary or that the data have a large error.

As described above, after the three-dimensional object is detected at S105 by the grouping shown in FIG. 8, the process goes to S106 and executes the distance data diagnosis processing shown in FIG. 10.

In the flowchart of FIG. 10, first, it is determined at step S501 whether or not the vehicle 1 travels on an approximately straight road at the steering angle setted to −10° to 10°. When the steering angle δ is larger than −10° to 10°, no diagnosis processing is executed, and the process escapes from the routine as it is. This is because when the distance is detected by the laser radar, it is difficult to recognize the three-dimensional object because the laser beam is projected at the inclined angle and is not reflected by the object, and thus there is a possibility that an accurate result of the diagnosis processing is not obtained, while the guard rail and the side wall are recognized when the distance is detected by an image.

When the vehicle 1 travels on the approximately straight road at the steering angle δ within the range of −10° to 10° as the result of determination at S501, the process goes to S502 and sets the initial value of the total number of the three-dimensional objects to be determined n0, the initial value of the number of the three-dimensional objects without the image n1 and the initial value of the number of the three-dimensional objects without the laser radar n2.

Then, the process goes to S503 and determines whether or not the three-dimensional object is to be diagnosed. This determination is made depending upon whether or not the three-dimensional object is located at the portion where the field of view of the laser radar overlaps the field of the view of the image and depending upon whether or not the three-dimensional object exists 40 to 70 m forward of the vehicle 1 and whether or not the object has a width of 50 cm or more.

When it is determined as the result of determination at S503 that the three-dimensional object does not satisfy the above conditions and is not to be diagnosed, the process jumps to S510 and determines not to diagnose the three-dimensional object.

In contrast, when it is determined that the three-dimensional object is to be diagnosed as the result of the determination at S503, the process goes to S504 and increments the total number of the three-dimensional objects to be determined n0 by 1 (n0=n0+1). Then, the process goes to S505 and reads the image-measured distance data zln1 (data stored at S202) and the laser-measured distance data zln2 (data stored at 202) from the grouped data for forming the three-dimensional object in correspondence to the grouped data.

Then, the process goes to S506 and determines whether or not there are the image-measured distance data zln1 corresponding to the three-dimensional object as well as whether or not there is no laser-measured distance data zln2 corresponding to the three-dimensional object. When the above conditions are satisfied, the process goes to step S507 and increments the number of the three-dimensional objects without the laser radar n2 by 1 (n2=n2+1).

Further, when the determination conditions at S506 are not satisfied, the process goes to S508 and determines whether or not there is no image-measured distance data zln1 corresponding to the three-dimensional object as well as whether or not there are the laser-measured distance data zln2 corresponding to the three-dimensional object. When the above conditions are satisfied, the process goes to step S509 and increments the number of the three-dimensional objects without image n1 by 1 (n1=n1+1).

Then, when even the conditions at S508 are not satisfied, that is, there is neither the image-measured distance data zln1 nor the laser-measured distance data zln2 that corresponds to the three-dimensional object or when there are both the image-measured distance data zln1 and the laser-measured distance data zln2 that correspond to the three-dimensional object, the process goes to S510 and excludes the three-dimensional object from the subject to be diagnosed.

After the completion of the processing step at S507, S509, or S510, the process goes to S511 and determines whether or not the determination is executed to all the three-dimensional objects, and the process returns to S503 and repeats the above processing steps when all the three-dimensional objects are not yet subjected to the determination.

When it is determined at S511 that all the three-dimensional objects are subjected to the determination, the process goes from S511 to S512, calculates the undetecting ratio of the image from the total number of the three-dimensional objects to be processed n0 and the number of the three-dimensional objects without the image n1 (=(n1/n0)·100%), and further calculates the undetecting ratio of the laser radar (=(n2/n0)·100%).

Subsequently, the process goes to S513 and increments the image capability determination timer when the undetecting ratio of the image is equal to or larger than the preset detecting ratio threshold value k6, whereas the image capability determination timer is decremented when it is less than the detection ratio threshold value k6. Likewise, when the undetecting ratio of the laser radar is equal to or larger than the preset detection ratio threshold value k5, the laser radar capability determination timer is incremented, whereas the laser radar capability determination timer is decremented when it is less than the detection ratio threshold value k5.

Then, the process goes to S514 and determines whether or not the value of the image capability determination timer exceeds the presetted output threshold value k1. When the value exceeds the output threshold value k1, the process goes to S515 and lights the detected state display lamp 8b as prescribed by deciding that the distance measuring capability of image is deteriorated. Further, when the value of the image capability determination timer is equal to or less than the presetted cancel threshold value k2(<k1) at S514, the process goes to S515 and extinguishes the detected state display lamp 8b being litted.

Further, the process goes to S514 and determines whether or not the value of the laser radar capability determination timer exceeds the presetted output threshold value k3. When the value exceeds the output threshold value k3, the process goes to S515 and lights the detected state display lamp 8b as prescribed by deciding that the distance measuring capability of the laser radar is deteriorated. Further, when the value of the laser radar capability determination timer is equal to or less than the preset cancel threshold value k4 (<k3) at step S514, the process goes to S515 and extinguishes the detected state display lamp 8b being lit.

As described above, according to this embodiment, the deterioration of the distance detecting capabilities of the image and the laser radar is determined in dependency on whether or not there are the distance data obtained by the image and the distance data obtained by the laser radar as to the finally detected three-dimensional object. Accordingly, the deterioration of the distance measuring capabilities of the image and the laser radar is promptly and accurately determined. Note that, the embodiment simply diagnoses the three-dimensional object depending upon whether or not there are the image-measured distance data zln1 or the laser-measured distance data zln2. However, the three-dimensional object may be also simply diagnosed by another method, for example, by comparing the difference between the three-dimensional object to be diagnosed and the image-measured distance data zln1 with the difference between the three-dimensional object to be diagnosed and the laser-measured distance data zln2.

After the completion of the above distance data diagnosis processing at S106, the process goes to S107 and executes a collision/contact alarm control. That is, other vehicles, the obstacles, and the like existing on the right and left lanes adjacent to the lane of the vehicle 1 are extracted on the basis of the information of the three-dimensional objects from the three-dimensional object detection processing section 5d, the vehicle speed V from the vehicle speed sensor 6, and the like, the possibility of the collision and the contact thereof with the vehicle 1 is decided from the sizes of the detected objects, the relative speeds of them to the vehicle 1 determined from the positional changes with the time, and the alarm is given by lighting the collision alarm lamp 8a of the combination meter 8 according to the result of decision, when necessary.

As described above, according to the present invention, the deterioration of the distance detecting capability of the laser radar and the deterioration of the distance detecting capability of the image are promptly determined without executing the calculation using many parameters, thereby control such as the prompt notification of the diagnosed state of a system to the driver, and the like is executed.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A monitor system of a vehicle outside, comprising:
   image-measured distance detecting means for detecting a distance between a vehicle and a three-dimensional object existing in front of the vehicle based on information of an image in front of the vehicle;
   laser-measured distance detecting means for detecting the distance between the vehicle and the three-dimensional object existing in front of the vehicle on the basis of the information of a laser radar by projecting a laser beam from the vehicle;
   three-dimensional object recognizing means for recognizing the three-dimensional object existing in front of the vehicle based on the distance detected by the image-measured distance detecting means and the distance detected by the laser-measured distance detecting means; and
   distance detecting capability diagnosing means for determining a deterioration of a distance detecting capability of the image-measured distance detecting means based on the distance, which is detected by the image-measured distance detecting means, of the three-dimensional object recognized by the three-dimensional object recognizing means as well as determining a deterioration of a distance detecting capability of the laser-measured distance detecting means based on the distance, which is detected by the laser-measured distance detecting means, of the three-dimensional object recognized by the three-dimensional object recognizing means.

2. The monitor system according to claim 1, wherein:
   the distance detecting capability diagnosing means determines the deterioration of the distance detecting capability of the image-measured distance detecting means and the deterioration of the distance detecting capability of the laser-measured distance detecting means only when the vehicle travels on an approximately straight lane.

3. The monitor system according to claim 1, wherein:
   the distance detecting capability diagnosing means detects a three-dimensional object with a width equal to or larger than a predetermined width as a subject of the determination.

4. The monitor system according to claim 1, wherein:
   the distance detecting capability diagnosing means detects the three-dimensional object located at a position within a predetermined distance as the subject of the determination.

5. The monitor system according to claim 1, wherein:
   the distance detecting capability diagnosing means determines the deterioration of the distance detecting capability of the image-measured distance detecting means and the deterioration of the distance detecting capability of the laser-measured distance detecting means only when the vehicle travels on the approximately straight lane and the distance detecting capability diagnosing means detects the three-dimensional object with the width equal to or larger than the predetermined width as the subject of the determination.

6. The monitor system according to claim 1, wherein:
   the distance detecting capability diagnosing means determines the deterioration of the distance detecting capability of the image-measured distance detecting means and the deterioration of the distance detecting capability of the laser-measured distance detecting means only when the vehicle travels on the approximately straight lane and the distance detecting capability diagnosing means detects the three-dimensional object located at the position within the predetermined distance as the subject of the determination.

7. The monitor system according to claim 1, wherein:
   the distance detecting capability diagnosing means detects the three-dimensional object with the width equal to or larger than the predetermined width and located at the position within the predetermined distance as the subject of the determination.

8. The monitor system according to claim 1, wherein:
   the distance detecting capability diagnosing means determines the deterioration of the distance detecting capability of the image-measured distance detecting means and the deterioration of the distance detecting capability of the laser-measured distance detecting means only when the vehicle travels on the approximately straight lane, and the distance detecting capability diagnosing means detects the three-dimensional object with the width equal to or larger than the predetermined width and located at the position within the predetermined distance as the subject of the determination.

9. The monitor system according to claim 1, wherein:
the distance detecting capability diagnosing means calculates the ratio of the cases in which the distance is not detected by the image-measured distance detecting means as an image-measured distance undetecting ratio when the distance of the three-dimensional object is detected by the image-measured distance detecting means, and the distance detecting capability diagnosing means determines that the image-measured distance detecting means is in a distance detecting capability deteriorating state and determines the deterioration of the distance detecting capability of the image-measured distance detecting means according to the continuously deteriorating state of the distance detecting capability of the image-measured distance detecting means when the image-measured distance undetecting ratio is equal to or larger than a predetermined value.

10. The monitor system according to claim 1, wherein:
the distance detecting capability diagnosing means calculates the ratio of the cases in which the distance is not detected by the laser-measured distance detecting means as a laser-measured distance undetecting ratio when the distance of the three-dimensional object is detected by the laser-measured distance detecting means, and the distance detecting capability diagnosing means determines that the laser-measured distance detecting means is in a distance detecting capability deteriorating state and determines the deterioration of the distance detecting capability of the laser-measured distance detecting means according to the continuously deteriorating state of the distance detecting capability of the laser-measured distance detecting means when the laser-measured distance undetecting ratio is equal to or larger than a predetermined value.

11. The monitor system according to claim 1, wherein:
the distance detecting capability diagnosing means calculates the ratio of the cases in which the distance is not detected by the image-measured distance detecting means as the image-measured distance undetecting ratio when the distance of the three-dimensional object is detected by the image-measured distance detecting means, and the distance detecting capability diagnosing means determines that the image-measured distance detecting means is in a distance detecting capability deteriorating state and determines the deterioration of the distance detecting capability of the image-measured distance detecting means according to the continuously deteriorating state of the distance detecting capability of the image-measured distance detecting means when the image-measured distance undetecting ratio is equal to or larger than the predetermined value, as well as the distance detecting capability diagnosing means calculates the ratio of the cases in which the distance is not detected by the laser-measured distance detecting means as the laser-measured distance undetecting ratio when the distance of the three-dimensional object is detected by the laser-measured distance detecting means, and the distance detecting capability diagnosing means determines that the laser-measured distance detecting means is in a distance detecting capability deteriorating state and determines the deterioration of the distance detecting capability of the laser-measured distance detecting means according to the continuously deteriorating state of the distance detecting capability of the laser-measured distance detecting means when the laser-measured distance undetecting ratio is equal to or larger than the predetermined value.

12. The monitor system according to claim 11, wherein:
the distance detecting capability diagnosing means determines the deterioration of the distance detecting capability of the image-measured distance detecting means and the deterioration of the distance detecting capability of the laser-measured distance detecting means only when the vehicle travels on the approximately straight lane.

13. The monitor system according to claim 11, wherein:
the distance detecting capability diagnosing means detects the three-dimensional object with the width equal to or larger than the predetermined width as the subject of the determination.

14. The monitor system according to claim 11, wherein:
the distance detecting capability diagnosing means detects the three-dimensional object located at the position within the predetermined distance as the subject of the determination.

15. The monitor system according to claim 11, wherein:
the distance detecting capability diagnosing means determines the deterioration of the distance detecting capability of the image-measured distance detecting means and the deterioration of the distance detecting capability of the laser-measured distance detecting means only when the vehicle travels on the approximately straight lane and the distance detecting capability diagnosing means detects the three-dimensional object with the width equal to or larger than the predetermined width as the subject of the determination.

16. The monitor system according to claim 11, wherein:
the distance detecting capability diagnosing means determines the deterioration of the distance detecting capability of the image-measured distance detecting means and the deterioration of the distance detecting capability of the laser-measured distance detecting means only when the vehicle travels on the approximately straight lane and the distance detecting capability diagnosing means detects the three-dimensional object located at the position within the predetermined distance as the subject of the determination.

17. The monitor system according to claim 11, wherein:
the distance detecting capability diagnosing means detects the three-dimensional object with the width equal to or larger than the predetermined width and located at the 18. The monitor system according to claim 11, wherein:
the distance detecting capability diagnosing means determines the deterioration of the distance detecting capability of the image-measured distance detecting means and the deterioration of the distance detecting capability of the laser-measured distance detecting means only when the vehicle travels on the approximately straight lane, and the distance detecting capability diagnosing means detects the three-dimensional object with the width equal to or larger than the predetermined width and located at the position within the predetermined distance as the subject of the determination.

19. A method for monitoring of a vehicle outside comprising the steps of:
- an image-measured distance detecting step of calculating a distance between a vehicle and a three-dimensional object existing in front of the vehicle based on information of an image in front of the vehicle;
- a laser-measured distance detecting step of detecting the distance between the vehicle and the three-dimensional object existing in front of the vehicle on the basis of the information of a laser radar by projecting a laser beam from the vehicle;
- a three-dimensional object recognizing step of recognizing the three-dimensional object existing in front of the vehicle based on the distance calculated by the image-measured distance detecting step and the distance detected by the laser-measured distance detecting step; and
- a distance detecting capability diagnosing step of determining a deterioration of a distance detecting capability of the image-measured distance detecting step based on the distance, which is detected by the image-measured distance detecting step, of the three-dimensional object recognized by the three-dimensional object recognizing step as well as determining a deterioration of a distance detecting capability of the laser-measured distance detecting step based on the distance, which is detected by the laser-measured distance detecting step, of the three-dimensional object recognized by the three-dimensional object recognizing step.

20. A method for monitoring of a vehicle outside comprising:
- calculating a distance between a vehicle and a three-dimensional object existing in front of the vehicle based on information of an image in front of the vehicle;
- detecting the distance between the vehicle and the three-dimensional object existing in front of the vehicle on the basis of the information of a laser radar by projecting a laser beam from the vehicle;
- recognizing the three-dimensional object existing in front of the vehicle based on the distance calculated by the calculating and the distance detected by the detecting; and
- determining a deterioration of a distance detecting capability of the calculating based on the distance, which is detected by the detecting, of the three-dimensional object recognized by the recognizing as well as determining a deterioration of a distance detecting capability of the detecting based on the distance, which is detected by the detecting, of the three-dimensional object recognized by the recognizing.

* * * * *